United States Patent
Denoual

(10) Patent No.: US 7,809,830 B2
(45) Date of Patent: Oct. 5, 2010

(54) OPTIMIZATION OF QUALITY OF SERVICE IN THE DISTRIBUTION OF BITSTREAMS

(75) Inventor: Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 1177 days.

(21) Appl. No.: 10/882,320

(22) Filed: Jul. 2, 2004

(65) Prior Publication Data
US 2005/0021726 A1    Jan. 27, 2005

(30) Foreign Application Priority Data
Jul. 3, 2003    (FR) .................................. 03 08136

(51) Int. Cl.
G06F 15/173    (2006.01)
G06F 15/16    (2006.01)

(52) U.S. Cl. ...................... 709/226; 709/231; 709/234; 709/235; 709/246

(58) Field of Classification Search ................. 709/236, 709/231
See application file for complete search history.

(56) References Cited

U.S. PATENT DOCUMENTS

| 6,014,694 | A * | 1/2000 | Aharoni et al. | ............. 709/219 |
| 6,308,222 | B1 * | 10/2001 | Krueger et al. | ............. 709/247 |
| 6,490,320 | B1 * | 12/2002 | Vetro et al. | ............ 375/240.08 |
| 6,628,300 | B2 * | 9/2003 | Amini et al. | ................ 345/660 |
| 2002/0136298 | A1 * | 9/2002 | Anantharamu et al. | . 375/240.12 |
| 2002/0140851 | A1 | 10/2002 | Laksono | ................... 348/388.1 |

(Continued)

FOREIGN PATENT DOCUMENTS

EP    1 320 216    6/2003

(Continued)

OTHER PUBLICATIONS

R. S. Ramanujan, et al., "Adaptive Streaming of MPEG Video over IP Networks", Local Computer Networks, 1997. Proceedings, 22nd Annual Conference on Minneapolis, MN, USA, Nov. 2-5, 1997, Los Alamitos, CA, IEEE Computer Society, Nov. 2, 1999, pp. 398-409.

(Continued)

Primary Examiner—Rupal D Dharia
Assistant Examiner—Joe Chacko
(74) Attorney, Agent, or Firm—Fitzpatrick, Cella, Harper & Scinto

(57) ABSTRACT

The invention distributes bitstreams by a server to a plurality of client devices connected to the server via a network, in which the server device transfers a bitstream via the network to a client device belonging to the plurality of client devices, and in which the bitstream may be transcoded according to a plurality of predetermined transcoding methods. In the invention, a rate associated with each of the bitstreams is calculated after application of at least one of the plurality of transcoding methods. Each client device is classified, and a determination is made, among the plurality of predetermined transcoding methods, those which are acceptable for each client device, depending on the calculated rates and the classification. A global selection of a set of transcoding methods is then performed, each method being associated with a client device of the plurality of client devices, among the acceptable methods, depending on predetermined criteria comprising at least taking into account bandwidth of the network.

33 Claims, 9 Drawing Sheets

U.S. PATENT DOCUMENTS

2003/0227977 A1* 12/2003 Henocq ............... 375/240.26
2004/0267956 A1* 12/2004 Leon et al. ............... 709/231

FOREIGN PATENT DOCUMENTS

FR          2 832 581       11/2001
FR          2 840 495       5/2002
WO          WO 02/35844     5/2002

OTHER PUBLICATIONS

R. Mohan, et al., "Adapting Multimedia Internet Content for Universal Access", IEEE Transactions on Multimedia, vol. 1, No. 1, Mar. 1999.

S. Chandra, et al., "Differentiated Multimedia Web Services Using Quality Aware Transcoding", Infocom Proceeding 2000, 19th Annual Joint Conference of IEEE Computer and Communications Societies, vol. 2, pp. 961-968.

S. McCanne, et al., "Low-Complexity Video Coding for Receiver-Driven Layered Multicast", IEEE Journal on Selected Areas in Communications, vol. 15, No. 6, Aug. 1997, pp. 983-1001.

P. Bocheck, et al., "Content-based VBR Video Traffic Modeling and its Application to Dynamic Network Resource Allocation", Technical Report, Columbia University, 1998. (site visited Aug. 10, 2004) <http://:www.ctr.columbia.edu/~bocheck/publications/CTR486-98-20abs.html>.

J. Ribas-Corbera, et al., "Rate control for low-delay video communications", ITU Study Group 16, Video Coding Experts Group, Document Q15-A-20, Portland, Jun. 97.

"Information Technology—Generic coding of audio-visual objects—Part 2: visual", ISO/IEC JTC1/SC 29/WG11 Document N3056 of Dec. 2000.

E. Feig, et al., "Fast Algorithms for the Discrete Cosine Transform", IEEE Transactions on Signal Processing, vol. 40, No. 9, Sep. 1992.

* cited by examiner

Connections: (C=1,S=1), (C=2,S=2), (C=3,S=1), (C=4,S=3), (C=5,S=2), (C=6,S=4)

| C (client connected) | | 1 | 2 | 3 | 4 | 5 | 6 |
|---|---|---|---|---|---|---|---|
| Class of the client | | HQ | LQ | LQ | HQ | LQ | LQ |
| S (sequence requested) | | 1 | 2 | 1 | 3 | 2 | 4 |
| Class of the current segment | | HM/LS | LM/HS | LM/HS | LM/LS | LM/HS | LM/HS |
| Transcoding methods | T1 | TSS1 | TSS13 | TSS25 | TSS37 | TSS13 | TSS49 |
| | T2 | TSS2 | x | TSS26 | TSS38 | x | x |
| | T3 | TSS3 | x | TSS27 | TSS39 | x | x |
| | ... | ... | ... | ... | ... | ... | ... |
| | T8 | TSS8 | TSS20 | x | TSS44 | TSS20 | x |
| | ... | ... | ... | ... | ... | ... | ... |
| | T12 | x | TSS24 | TSS36 | TSS48 | TSS24 | TSS60 |

Figure 8

OPTIMIZATION OF QUALITY OF SERVICE IN THE DISTRIBUTION OF BITSTREAMS

BACKROUND OF THE INVENTION

1. Field of the Invention

The present invention relates to the adaptation of multimedia contents in the framework of a transmission, by re-encoding or transcoding.

2. Description of the Related Art

Advances made in digital apparatuses such as televisions, conventional or pocket microcomputers, or portable telephones are such that, in future years, it will very probably be possible to exchange data of a multimedia type, for example audio and/or video, between these different apparatuses. Market studies show, moreover, that users are ready to purchase such communication systems provided that the price is not too excessive and, above all, that the services rendered are of good quality.

Following the appearance of this new market, numerous studies have been carried out concerning the miniaturization of components, so as to obtain apparatus with high memory and computational capabilities while maintaining limited weight and volume. Furthermore, many standardization bodies have produced standards for unifying data exchanges between these apparatuses with different characteristics. These standards, such as the IEEE 802 family, allow both the implementation and the management of the transfer of data via a particular network.

IEEE 802.11 and its European counterpart HYPERLAN are dedicated to wireless local area networks. These are being particularly studied at the present time since they are broadband networks making it possible to transmit videos between two machines which are geographically close. One of the consumer applications concerned is the implementation of wireless local area networks in the home. Indeed, these technical solutions make it possible to transmit digital data either between a so-called server machine and a so-called client machine (point-to-point transmission), or between the server and a group of clients, or between the server and a plurality of clients (multipoint communication), this being entirely wireless. The data are stored on the server which centralizes all the communications with the clients. This machine can also serve as a gateway with the outside world (Internet, television, camcorder, etc.). It should be noted that home area networks can be of a heterogeneous nature, that is to say they can, for example, consist partly of wireless connections and partly of cabled connections.

Though many projects are studying the implementation of services around interactive television and the exchanges of information on the Internet, few of them deal with the problems related to the implementation of home area networks, namely the setting up of solutions for obtaining an acceptable quality of service.

As the server is connected to the outside world, digital data are stored on it of a variety of types and sizes. The data are later sent to clients on request. However, the transport of these data over a local area network is not a simple functionality to implement, since it is in certain respects necessary, and in others simply desirable, for the transport to be adapted to the context in which the transmission is made. The term context should be understood to mean not only the characteristics of the network (in particular the available bandwidth) and the characteristics of the data transported, but also the characteristics of the client (such as the dimensions of its screen, its computational capability or the size of its random-access memory), and even, ideally, the preferences of the users of the client machines.

In order to illustrate the problems related to the implementation of this functionality, an example is now given. Consider an IEEE 802.11b network which enables the transmission of approximately 7 Mbit/s (in theory 11 Mbit/s). Let it be considered also that a video has been stored on the server having a rate of 4 Mbit/s and an image resolution of 1024 columns by 576 rows. Finally let it be assumed that the communication architecture comprises two clients: a microcomputer (screen size: 1024 by 576), and a pocket microcomputer (screen size: 576 by 288).

Suppose that at a particular moment the microcomputer requests the video. The microcomputer will have no problem to view it since the bandwidth of the network and its own characteristics enable this. Suppose now, however, that both clients request that video. Two problems then arise:

the bandwidth of the network does not enable transmission of two videos at 4 Mbit/s, and the pocket microcomputer cannot display a video of which the format is larger than the size of its screen.

The transmission of the video to both clients in its original version will then provide a mediocre quality of service. This is because the microcomputer will find its reception deteriorated by congestion on the network. The pocket microcomputer will at best only be able to display a portion of the images transmitted. The latter would probably have preferred to receive a version of the video with a reduced spatial resolution, which, furthermore, would have advantageously minimized the utilization of the bandwidth and thus the congestion of the network.

By means of this example, it can be seen that the adaptation of the video to the context in which it is transmitted is of the utmost importance to obtain a high Quality Of Service. Generally these adaptation mechanisms are grouped together under the name "transcoding methods". A number of such methods are known, such as:

the reduction of the "spatial resolution", that is to say the overall dimensions of the images (height and width), expressed in numbers of rows and columns of pixels, the reduction of the "frame rate", that is to say the display frequency of the images, and the reduction of the "rate", that is to say the fineness of the details of the images (a reduction known as "re-quantization").

In the state-of-the-art, several methods for adaptation of multimedia contents are to be found, in particular in a context of Web page consultation or distribution of videos on request.

For example, IBM, with its InfoPyramid system (see the article "*Adapting Multimedia Internet Content for Universal Access*" by R. Mohan et al., IEEE Transactions on Multimedia, vol. 1, no. 1, March 1999), proposes, on the one hand, to organize contents according to their complexity and richness (text, image, video), and on the other hand, to adapt the contents requested by a client to the characteristics of that client. For this purpose, the different clients who connect are listed in a cache memory by means of identifiers. The contents adapted to each client are also saved. IBM also proposes to store statistics on the status of the network over time in order to estimate subsequently the time for transmission of the data. The requests of clients who connect are satisfied one after the other, until the bandwidth of the network is saturated; but no renegotiation of the transcoding methods is then possible, since IBM does not offer any global method of management of the connections depending on the total bandwidth available.

In the article "*Differentiated Multimedia Web Services using Quality Aware Transcoding*" by S. Chandra et al. (Infocom Proceedings 2000), the authors propose dynamically sharing the bandwidth of the network among different classes of clients. Two classes are defined on the basis of criteria of privileged access to a transmission quality ("differentiated" service). The object is to propose access for a maximum of clients to contents of Web-page type with an acceptable quality. For this, they use a transcoding method which achieves a rate-distortion compromise in relation to images of JPEG type. The bandwidth is measured every second, and during the course of each second, the non-privileged clients share equally the difference between the bandwidth reserved for the "privileged clients" and the bandwidth which has just been measured. The average use of bandwidth thus makes it possible to anticipate a possible overload of the network and thus to react, either by modifying the transcoding, or by rejecting new clients. By contrast to the previous document, in the latter, the physical characteristics of the clients are not integrated in the adaptation process.

In the article "*Low Complexity Video Coding for Receiver-Driven Layered Multicast*" by S. McCann et al., IEEE Journal of Selected Areas in Communications, Vol. 16, No. 6, August 1997), each video is organized so as to be transmitted progressively: a basic bitstream is proposed, containing the information corresponding to a low quality of the video. Refinement bitstreams make it possible, in case of decoding, to enrich and to improve the quality of the video at the receiver. In this case the expression "scalable" source is used. According to this approach, the clients have to choose whether they subscribe or unsubscribe to the refinement levels depending on the level of the losses which they find on reception of those data. As this level of losses is a good indicator of the state of congestion of the network, this mechanism tends to prevent any congestion by sending to the different clients only the quantity of information which their link enables them to receive. However, this type of approach only focuses on the aspects of the network and remains sub-optimal since:

- the capabilities of the clients are not taken into account,
- the same client, sometimes with limited resources, must, in addition to the processing of the contents, manage the capacities of the network,
- the attempts at subscription and unsubscription of the clients generate higher traffic and contribute to the increase in congestion,
- the source must propose fine granularity leading to reduced efficiency in terms of compression,
- the levels of granularity proposed are chosen arbitrarily, and
- the nodes of the network must have capabilities for collecting together the bitstreams, which is not the case for current network architectures.

Similarly, in the article "*Content-based VBR Video Traffic Modeling and its Application to Dynamic Network Resource Allocation*" by P. Boheck et al. (Technical Report, Columbia University, 1998), a mechanism for dynamic allocation of the resources of the network is implemented for the distribution of videos. The bandwidth is allocated depending on the characteristics of the video. To do this, the authors propose a unit for analysis and classification of the video divided up into temporal segments (image sequences). Each video segment is associated with a class for which a bandwidth necessary for its transmission is estimated. The criteria utilized for the classification are for example: the number of video objects, the movement of the camera, and the type of movement between the images. If the rate necessary for the transmission of a segment proves to be greater than the available bandwidth, recourse to a method of transcoding is envisaged. This division into segments also makes it possible to determine the moments of renegotiation of the bandwidth between the different clients. Here too, as in the preceding reference, solely the characteristics of the contents and of the network are taken into account in the optimization process, which is sub-optimal in relation to the exploitation of the resources: it is indeed possible to send a client contents which are too rich with respect to its capabilities.

One of the problems to solve is thus to define a mechanism for selection of a method of transcoding which will make the video compatible not only with the characteristics of the network, but also with the characteristics of the client machine, and possibly also with the preferences of the user of that machine.

SUMMARY OF THE INVENTION

The invention thus relates to an optimization phase under constraints of transcoding parameters for sequences of digital data, for example multimedia data, which have been recorded beforehand on a server.

Thus, according to a first aspect, the invention relates to a method of distributing bitstreams, in which one or more server devices transfer a bitstream via a network to a client device belonging to a plurality of clients, and in which digital data may be transcoded according to a plurality of predetermined transcoding methods, said method comprising the following steps:

a) calculating the rate associated with each of said bitstreams after application of at least one of said plurality of transcoding methods;

b) classifying the clients connected to the network;

c) determining, among said plurality of predetermined transcoding methods, those which are acceptable for each client connected to the network, depending on said calculated rates and said classification of the clients; and d) performing a global selection of a set of transcoding methods, each method being associated with a client connected to the network, among said acceptable methods, depending on predetermined criteria comprising at least taking into account the bandwidth of the network.

Thus, according to the invention, for each client a transcoding method is determined, taken from a set of predetermined methods, which satisfies the technical constraints. The estimation of the rate reduces this optimization problem to a problem of rate-distortion type in which it is sought to optimally satisfy the requests presented by the clients under a constraint of maximum rate.

By virtue of the invention, the number of clients able to connect at any moment is increased, and the resources of the client machines are adequately used. Thus the bandwidth of the network is used optimally.

As regards the complexity of the decision-making process, it is clear that said classification of the clients connected to the network implies a certain cost, but on the other hand this complexity is, by virtue of the invention, reduced due to the reduction of the search space for the global distribution solution (see step c)); this is because the identification of the limitations of the capabilities of the clients makes it possible to eliminate from the outset (the case arising), for each client, the transcoding methods that are "incompatible", account taken of the contents requested by that client, so as to keep, at the global selection stage (step d)), only the "acceptable" transcoding methods.

This evaluation of the contents comprises at least the calculation, for each sequence recorded and for at least one respective transcoding method, of the rate of resulting data (see step a)). This calculation may for example, in known manner, involve a transcoding phase followed by a decoding phase of that sequence. It will then be possible to take advantage of this to estimate, for example, the decoding cost, in terms of memory and calculation, for the transcoding method considered. Even if such estimations represented non-negligible amount of work for the server, it should be noted that they may advantageously be performed for each sequence recorded, once and for all, offline, that is to say before clients connect to the server.

Said classification of the clients may take into account some client device capabilities such as the frequency of their central processor. It is thus possible to ensure that the transcoding method chosen for a client is such that the complexity (expressed in numbers of elementary operations per second) related to the decoding of the bitstream requested is less than or equal to the number of operations per second (a function of the execution speed of the processor) that the decoder of the client machine can execute. But these capabilities of a client machine may advantageously also comprise the size of its random-access memory (RAM) and/or the dimensions of its monitor.

As mentioned above, determining the acceptable transcoding methods takes into account, for each client connected to the network, the rate associated with the bitstream requested by that client after application of at least one transcoding method. However this determination of the acceptable transcoding methods may advantageously take into account characteristics of the contents other than the rate. For example, if said bitstream is associated with a video, the characteristics of that video which can be taken into account comprise the spatial resolution, and/or the frame rate, and/or the spatio-temporal activity, of temporal segments of that video in which the characteristics taken into account have a relatively uniform value.

By virtue of these provisions, it is possible to relate the characteristics of the contents with the capabilities of the clients, and include that compatibility in the criteria for the global selection.

In addition to taking into account the compatibility between each transcoded sequence and the client machine intended to receive it, said determination of the acceptable transcoding methods (step c)) may also, according to other particular features, take into account certain preferences of the users (for example: animated or fixed image, full screen or thumbnail, or number of colors of the image).

Furthermore, according to other particular features, it is possible to retrieve supplementary characteristics of the network in addition to its bandwidth, for example the lag (or delay) corresponding to the characteristic time taken by a data packet to transit from a source point to a destination point across the network; it is also possible for example to record the rate of packet loss, or the transmitted bit error rate, within the network. The global selection could then, advantageously, also take into account these other characteristics of the network in order to optimize the exploitation of the available resources.

It is also desirable for the taking of the global decision to take into account, in addition to their rate, certain other characteristics of the sequences to be transmitted, so as to be able to maximize the quality of the contents received as perceived by the group of clients.

Consequently, according to still other particular features, said predetermined criteria for the global selection comprise the maximization of a global quality factor calculated, for any given set of pairs (bitstream, and transcoding method), as a function of individual quality factors respectively attached to at least some of those pairs.

Thus, the quality of the transcoded contents will be estimated, and that estimation will be relied upon in the global decision-making process, so as to optimize the quality of the transcoded contents as perceived by the group of the users of the bitstream distribution system.

This global quality factor will be defined, according to the bitstream distribution system envisaged, so as to adequately represent that global quality. For example, the global quality factor may be taken as equal to the sum of the individual quality factors each respectively attached to the bitstream requested by a client connected to the network. As a variant, the global quality factor may be taken as equal to a weighted sum of the individual quality factors each respectively attached to the bitstream requested by a client connected to the network; thus, for example, these weighting coefficients may be adjusted depending on the levels of service to which the clients have respectively subscribed.

In this connection it will be noted that this estimation depends on the characteristics of the sequences of digital data to be transcoded. This is because, the impact of the transcoding on the quality is different from one sequence to another. It is known for example that a sequence with strong movement will greatly suffer from a reduction in the temporal resolution, whereas this same method applied to a sequence containing little movement will have little impact. The optimization of the Quality of Service may thus involve the evaluation of the loss of quality induced by each "compatible" transcoding method.

For this reason, according to still more particular features, said individual quality factor is obtained by encoding the bitstream considered with the transcoding method considered, and in accordance with the deviation between the bitstreams considered before and after transcoding, and with the dynamic range of the original signal.

Finally, it should be noted that the constraints limiting the global selection according to the invention may vary over time.

To take account of this, the global selection according to the invention may be implemented, for example, each time a client connects to the network and each time a client previously connected to the network disconnects, and/or each time that a programmable cyclical alarm reaches its term. Thus, attempts to subscribe or to unsubscribe by clients do not induce transitory congestion on the network.

According to a second aspect, the invention relates to various devices.

Thus, the invention relates to a server for the distribution of bitstreams transferred via a network to a plurality of client devices, it being possible for digital data to be transcoded by a plurality of predetermined transcoding methods, said server comprising:

a transcoding unit adapted to calculate the rate associated with each of said bitstreams after having applied at least one among said plurality of transcoding methods, a unit for classifying the clients connected to the network, and a decision engine adapted to determine, among said plurality of predetermined transcoding methods, those which are acceptable for each client connected to the network, depending on said calculated rates and said classification of the clients, and to perform a global selection of a set of transcoding methods, each method being associated with a client connected to the network, among said acceptable methods, depending on predetermined criteria comprising at least taking into account the bandwidth of the network.

According to particular features, said unit for classifying the clients is adapted to retrieve, for each client connected to the network, the frequency of its central processor, and/or the size of its read-only memory, and/or the dimensions of its monitor.

According to still other particular features, said bitstream transferred to a client is associated with a video, and said global selection performed by the decision engine takes into account the characteristics of that video comprising the spatial resolution, and/or the frame rate, and/or the spatio-temporal activity of temporal segments of that video in which the characteristics taken into account have a relatively uniform value.

According to still other particular features, said server further comprises a unit adapted to retrieve certain preferences of the users of the client devices, and said decision engine is adapted to take into account those preferences.

According to still other particular features, said server further comprises a unit adapted to retrieve characteristics of the network comprising at least its bandwidth, and said decision engine is adapted to take into account those network characteristics.

According to still other particular features, said global selection made by the decision engine comprises maximizing a global quality factor calculated, for any given set of pairs (bitstream, and transcoding method), as a function of individual quality factors respectively attached to at least some of those pairs.

According to still more particular features, said global quality factor is equal to the sum of the individual quality factors each respectively attached to the bitstream requested by a client connected to the network.

According to other still more particular features, said global quality factor is equal to a weighted sum of the individual quality factors each respectively attached to the bitstream requested by a client connected to the network.

According to still more particular features, said individual quality factor is obtained by encoding the bitstream considered with the transcoding method considered, and in accordance with the deviation between the bitstreams considered before and after transcoding, and with the dynamic range of the original signal.

According to particular features, said decision engine implements said global selection each time a client connects to the network, and each time a client previously connected to the network disconnects.

According to other particular features, said server further comprises a programmable cyclical alarm, and said decision engine implements said global selection each time said cyclical alarm reaches its term.

The invention also relates to:
  a computer comprising any one of the servers described succinctly above, as well as means for storing digital data and means for reading and writing those digital data,
  a non-removable data storage means comprising computer program code instructions for the execution of the steps of any one of the methods of distributing bitstreams succinctly described above,
  a partially or totally removable data storage means comprising computer program code instructions for the execution of the steps of any one of the methods of distributing bitstreams succinctly described above, and
  a computer program containing instructions such that, when said program controls a programmable data processing device, said instructions lead to said data processing device implementing any one of the methods of distributing bitstreams succinctly described above.

The advantages offered by those servers, that computer, those data storage means and that programmable computer are essentially the same as those offered by the methods according to the invention.

Other aspects and advantages of the invention will emerge from a reading of the following detailed description of particular embodiments, given by way of non-limiting example.

BRIEF DESCRIPTION OF THE DRAWINGS

FIG. 8 represents the table of the connections utilized by the decision engine according to the invention.

DETAILED DESCRIPTION OF THE PREFERRED EMBODIMENTS

Figure 1:
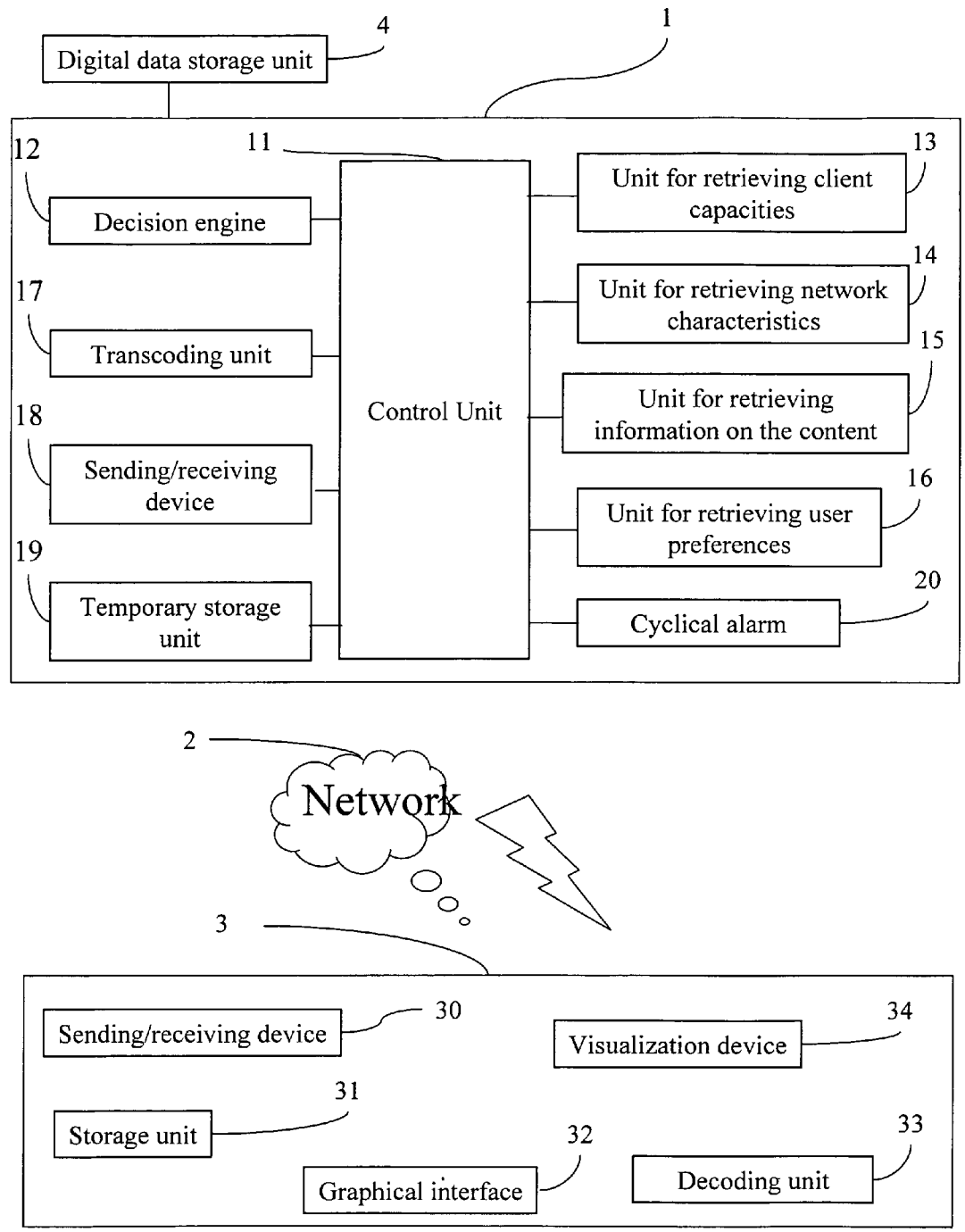
FIG. 1 is a block diagram illustrating the general architecture of a system for transmitting data between a server and a client, according to one embodiment of the invention.

FIG. 1 is a block diagram illustrating the general architecture of a system for transmitting data between a so-called "server" machine 1 and a so-called "client" machine 3.

These two machines are connected by a network 2 via a connection which is considered here as being established. This network is for example a wireless local area communication network within a dwelling. More particularly, the network is in accordance with the standard IEEE802.11. It may also comprise Internet access.

"Point to point" transmission between a server and a client is used here. Nevertheless, a plurality of "client" machines may connect to the server at the same time and request a version of the same contents without this modifying the invention in any way: solely the management of the processes of adaptation and sending in parallel of the different versions of the contents and the accesses to the memories at the server end will require to be added ("multicast transmission").

It will be noted that the data stored in the server may have been received either from within the dwelling, for example from a video camera, or from the environment external to the dwelling, for example from the Internet. These data may be, for example, fixed images, videos, sound, data of text type, documents in HTML language, or signals received from a photocopier or from a printer.

The available contents are stored, generally in compressed formats (for example: mp3 for audio, JPEG for images, and MPEG for videos), in a digital data storage unit (database) 4. This unit may be included in the device 1 or be external to it.

The server 1 comprises a unit 12, which will be referred to as a "decision engine", enabling a decision to be taken as to the adaptation of the contents depending on the transmission framework. The server also comprises a "transcoding unit" 17 making it possible to perform this adaptation. These two processes will be described in detail later. The server 1 also comprises a unit 19, adapted to temporarily store encoded videos and digital data.

For each client 3, a unit 13 of the server 1 retrieves the hardware characteristics of that client. In this embodiment, for the definition of these characteristics, the following parameters will be taken into account.

the frequency of the central processor, which corresponds to the time taken to execute an instruction, the size of the RAM available for processing the contents (essentially their decompression, performed by unit of 33 of FIG. 1), and the dimensions of the screen (monitor) expressed in pixels. The obtainment of the client machine characteristics is described below with reference to FIG. 3.

Unit 14 of server 1 is responsible for obtaining the characteristics of the network, in particular its bandwidth. This obtainment will be performed at predetermined instants. For example, in this embodiment, it will be performed each time a client 3 connects to the network 2. As a variant, it could for example, in a reliably stable closed distribution system, suffice to measure the bandwidth when the composition of the system is modified.

Unit 15 of server 1 deals with the analysis of the requested contents. For example, for a video encoded in MPEG-4 format, this standard defines different levels and profiles which make it possible to determine characteristic values of the contents description parameters, such as:

the spatial resolution of the images composing the video, the number of images per second, and the rate at which the video is encoded Concerning MPEG-4, reference may be made to the standard ISO/IEC JTC1/SC 29/WG11 N3056 of December 2000, entitled "*Information Technology—Generic coding of audio-visual objects—part 2: visual*". This information inherent to the MPEG-4 standard is necessary but is not sufficient to finely characterize the contents. Thus, the contents analysis unit 15 makes it possible to extract supplementary characteristics which are detailed below, with reference to FIG. 4, in accordance with the "offline" part (that is to say, while not connected) of the method according to the invention.

Unit 16 of the server 1 obtains the preferences of the user, which the latter has been able to specify by means of a graphical interface (unit 32 in the FIG. 11). The server 1 also contains a device 18 for sending and receiving, which enables it to communicate with the clients 3.

The cyclical alarm 20 acts to periodically trigger renegotiations of the connections as described further on.

Finally, the server 1 comprises a control unit 11, to control the overall operation of the device.

The "client" machine 3 comprises a device 30 for sending and receiving digital data. This device permits the sending of data to the server via the network and the reception of the data from the server. It also comprises a unit 31 for storage of digital data, a unit 33 for decoding and a viewing device 34 enabling the decoded videos to be viewed. The graphical interface 32 enables the user of that client machine to interact and to control those different units.

It will be noted that the different units composing the server 1 are represented on FIG. 1 as residing on the same machine. However, it is perfectly possible to distribute those units over several server machines, and to establish communications between those different units via the communication network 2. Similarly, the different units composing a client 3 may be distributed over a plurality of machines.

The production of transcoding method descriptors will now be described, as well as the classification in terms of contents of the digital data made available to the clients 3.

Thus, prior to any connection, a set of transcoding methods is defined, which are then classified by type. In this embodiment, three types of transcoding will be defined:

1) reduction of the spatial resolution:

conservation of the initial resolution, or conversion of the CIF ("Common Intermediate Format") resolution, i.e. 352 columns by 288 rows, to QCIF ("*Quarter-Common Intermediate Format*") resolution i.e. 176 columns by 144 rows, 2) reduction of the frame rate:

conservation of the initial frame rate, for example, 30 images per second (Im/s), or passage from 30 to 20 Im/s, or passage from 30 to 15 Im/s, or passage from 30 to 10 Im/s, or passage from 30 to 5 Im/s, or passage from 30 to 1 Im/s, and 3) requantization (reduction of the rate):

conservation of the initial rate, or reduction of the rate by 10%, or reduction of the rate by 25%, or reduction of the rate by 33%, Thus, depending on that choice, twelve elementary transcoding methods are defined, leading to a total of: 2×6×4=48 different transcoding methods if they are combined.

Figure 4:
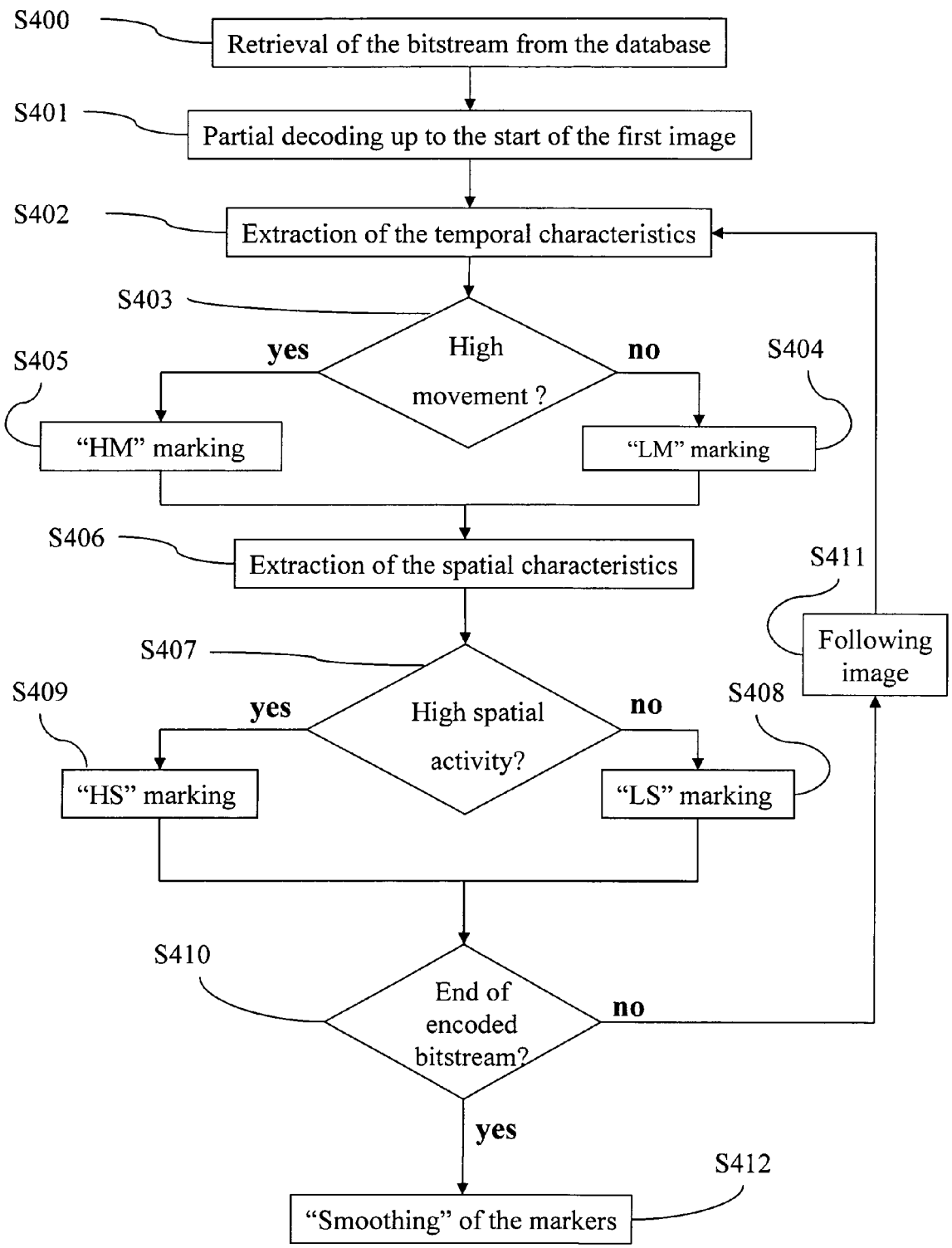
FIG. 4 is an algorithm for analysis and classification of the contents of a video.

For each sequence of digital data introduced into the storage unit 4 of the server 1, an analysis and classification algorithm illustrated in FIG. 4 is implemented.

The contents analysis unit 15, in addition to the characteristics mentioned earlier, makes it possible to characterize more precisely the contents of the transmitted data. The operation of the unit 15 will be illustrated by taking the example of video data. Unit 15 must then in particular cut up that video into temporal segments in which the images have common properties. These characteristics represent, in this embodiment:

the spatial activity of each image, and the temporal activity between two successive images.

This analysis process makes it possible, on the one hand, to cut up that video into temporal segments having the same characteristics, and on the other hand to facilitate deciding as to the most appropriate manner of adapting that video to a transmission framework. This is because, as mentioned in the introduction, a sequence comprising a high level of movement will suffer more from a reduction of temporal resolution than from a reduction in spatial resolution. It is thus necessary to integrate the characteristics intrinsic to the contents into the adaptation process. Moreover, a video possesses characteristics which vary overtime, and for this reason it is also appropriate to take into account these temporal variations in the process of adaptation by periodically updating the adaptation parameters.

The process of analysis of a video sequence commences by the transfer of that sequence from the storage unit 4 to the unit 19 of the server 1 (step S400 of FIG. 4). A partial decoding of the header information is then performed by a decoder present in the unit 15 of the server 1 at step S401, so as to get to the beginning of the data relating to the first image of the sequence. The following step S402 consists of retrieving the information relating to the temporal activity of the sequence.

In this embodiment, the information is represented by movement vectors. The following step S403 consists of comparing the mean amplitude of the movement vectors linked to the image to a threshold. If this mean amplitude is greater than the threshold, the image is marked as having a high level of temporal activity (HM, for "High Motion") at step S405. In the opposite case, it is marked as having a low temporal activity (LM, for "Low Motion") at step S404. The marker describing the class of the image is, in this embodiment, stored in a table associated with the sequence in the unit 4 of the server 1.

Next, the decoder of unit 15 proceeds with the extraction of the spatial features of the current image which, in this embodiment, are represented by the total energy of all the DCT ("Discrete Cosine Transform") coefficients of each block constituting the image. This energy is next compared to a threshold at step S407 to decide if the image has Low Spatial activity ("LS" marking at step S408) or High Spatial activity ("HS" marking at step S409).

Four possible classes are thus seen to appear for an image: HM/HS, HM/LS, LM/HS and LM/LS. Once the marker of the current image has been defined and inserted in the table associated with the sequence in unit 4 of server 1, it is tested during the step S410 whether or not the last image has been reached. If there remain images to be processed, the following image is passed on to at step S411 then steps S402 to S410 are reiterated.

If the current image is the last of the sequence, then step S412 is passed on to which performs post-processing on the calculated markers. This post-processing consists of defining the segments by keeping as a marker only the marker most often encountered in the corresponding successive images, in this embodiment, in the same second of the video.

In the present embodiment, the characteristics of any given video sequence after application of any given transcoding method are recorded in a data structure termed "transcoding solutions structure" (TSS). Such transcoding solutions structures have been previously described, in the particular case of XML data structures, in French patent application No. 0206554 in the name of Canon (in that document see in particular the description referring to FIG. 4b). A TSS is associated with each segment of each sequence of data introduced into unit 4 of server 1 and also with each transcoding method. Thus, in this embodiment, each sequence segment is associated with 48 TSSs. Such a structure may be represented by approximately 10 bytes, which requires of the order of 500 bytes per video segment and, by way of example, 3.5 Mb for a video sequence of a duration of 2 hours cut up into segments of one second. Each TSS contains a certain amount of information recorded in respective fields. In the present embodiment, the following items of information are concerned:

1) the mean visual quality given by the transcoding method: in this embodiment the PSNR ("Peak Signal-to-Noise Ratio") will be used for this, defined by $$PSNR=10 \log_{10}\{(2Y)^2/MSD\},$$

where MSD is the mean square deviation between the video sequence requested and the transcoded sequence, and Y is the dynamic of the original signal, here 8 bits, 2) the cost in memory, expressed in Mb, 3) the computational power necessary for decoding in real-time, expressed in terms of processor frequency in MHz, 4) the rate produced by the method, expressed in kbit/s, 5) the format of the images (spatial resolution) after transcoding, and 6) the frame rate of the images.

Figure 6:
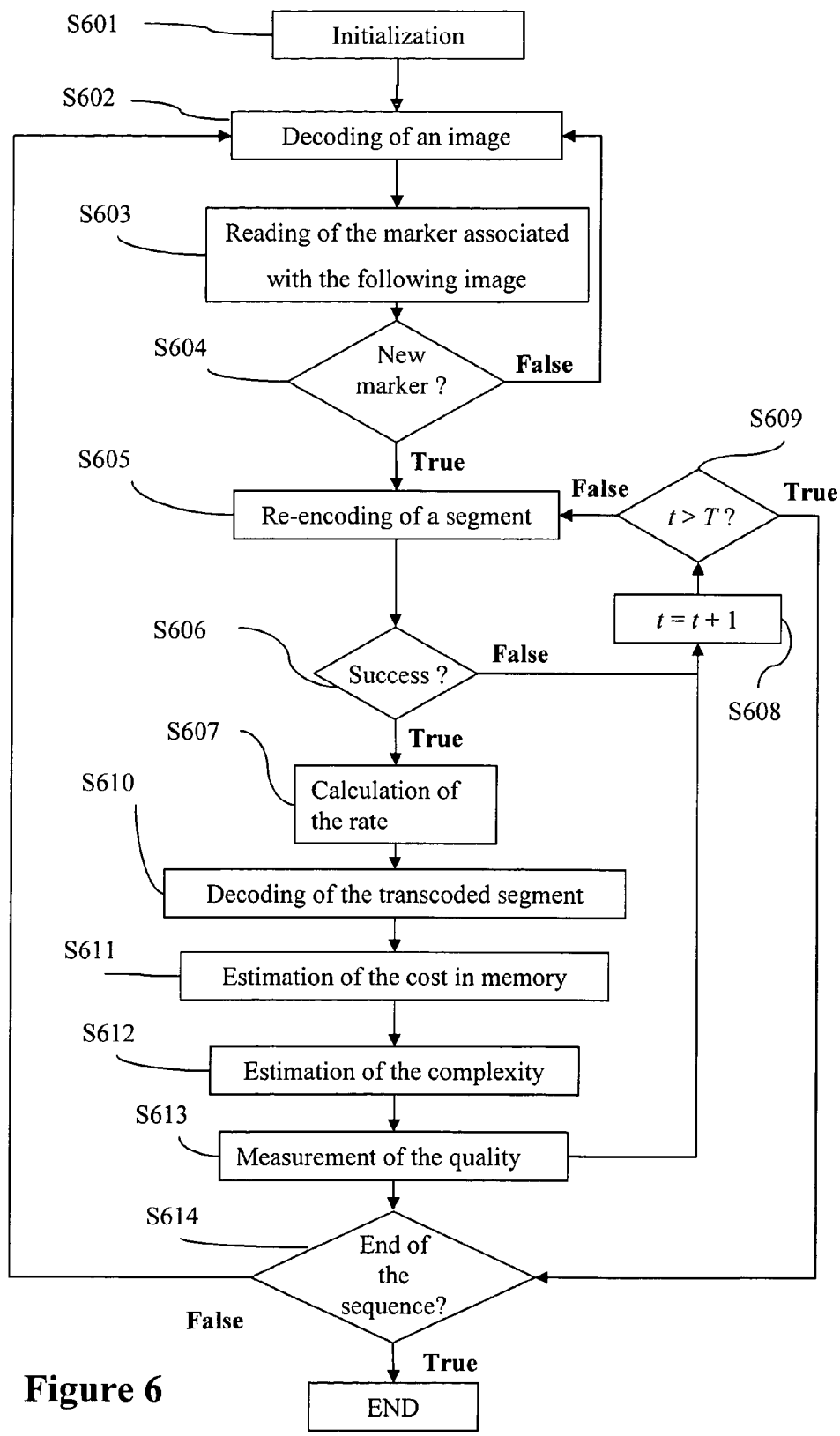
FIG. 6 represents an algorithm for providing information, for a segment of video sequence, to a structure of transcoding solutions.

The algorithm represented in FIG. 6 makes it possible to enter information into the different fields of the transcoding solutions structures.

Let S be the sequence in the MPEG-4 format newly stored in unit 4 of server 1, and let T be the number of transcoding methods defined previously (i.e. T=48 in this embodiment). The algorithm commences at step S601 by a phase of initialization of a variable t to 0. This variable is dedicated to counting the transcoding methods. During the same step S601, the extraction is carried out of the sequence S to be processed from the storage unit 4 of the server 1, as well as its insertion in the temporary storage unit 19 of the server 1, this being to facilitate its reutilization in the loop of the transcoding methods. During the step S601, from unit 4 of server 1, the marker is also retrieved that indicates the class of the first image of the sequence S. The step is followed by the step S602 which performs the decoding of an image of the sequence S. The decoded image is saved during the same step S602 in a temporary storage unit 19 of server 1. The following step, S603, consists of retrieving from storage unit 4 of server 1 the class indicator of the following image. The marker thus read is compared to the marker of the preceding image during step S604. If that marker is identical to the preceding marker, then step S602 is returned to in order to decode the following image, then the steps S603 to S604 are repeated until a different marker is found or until the end of the sequence S is reached. If on the contrary the marker read is different from the preceding marker, it is deduced from this that a whole segment of the sequence S has been decoded. In this case, the step S605 is passed on to for re-encoding that segment according to the encoding parameters corresponding to the transcoding method t.

Before commencing the re-encoding, the fields "spatial resolution" and "frame rate" of the TSS associated with the transcoding method t are provided with the values concerned by the transcoding method t. The transcoding, which is performed by the transcoding unit 17 of server 1, consists, once a complete segment of the sequence S has been decoded, of re-encoding it (step S605) according to the new parameters associated with the method t.

For a mere reduction in the spatial resolution, the encoder will commence by sub-sampling each image of the sequence segment decoded at step S602. For this it will remove one pixel out of two in each row of each image of the original sequence. In a second phase it will remove one pixel out of two in each column of each image of the original sequence. It will then proceed with the actual encoding of the sub-sampled sequence.

For a mere reduction in frame rate, if $F_t$ and $F_t'$ are respectively the initial frame rate and the frame rate after transcoding, $H=F_t-F_t'$ images will be removed from each group of $F_t$ successive images of the sequence segment decoded at step S602. The H images removed will be spaced apart as regularly as possible in each group of $F_t$ images.

For a mere requantization, the images of the sequence segment decoded at step S602 will be re-encoded with the new rate constraint imposed by the transcoding method. This assumes the use in the encoder, at step S605, of a rate-control algorithm. In this embodiment, use will be made of the algorithm described by J. Ribas-Corbera et al. in the article entitled "*Rate Control for Low-Delay Video Communication*" (Draft ITU-Telecommunications standardization sector, Q15-A-20). Note that the encoding and decoding algorithms are those of the MPEG-4 standard.

At step S606, it is verified that the attempt at re-encoding in step S605 has succeeded. This is because, for technical reasons, it may occur that it is not possible to satisfy one, or a plurality, of the requirements (reduction of the spatial resolution, reduction of the frame rate, reduction of the fineness of the image) associated with the transcoding method considered, when that method is applied to the sequence segment considered. The transcoding method t is then noted as being unusable: the field of the associated TSS are all set to 0. This provision advantageously makes it possible, at the later age of global decision taking described below with reference to FIG. 7, to limit the search space for the optimal solution. In this case it is proceeded to the test for the following transcoding method (t+1) at step S608, verifying that there is one at step S609. The process then resumes with the encoding, at step S605, of the segment decoded at step S602 still present in memory 19 of server 1, according to the new parameters associated with the new transcoding method.

Once the segment has been re-encoded in accordance with the transcoding method t, step S607 enables the transcoding unit 17 to calculate and to record the rate r (in number of bits per second) for that segment. This rate calculation consists of examining the number of bits B of the transcoded bitstream as well as the number of images N contained in that same bitstream. The rate r is next given by $r = F_t' \times (B/N)$, where $F_t'$ is the frame rate associated with the transcoded bitstream.

The video segment considered is next decoded at step S610 so as to evaluate its quality (its PSNR, in this embodiment), as well as the cost of decoding it. During the decoding of step S610, the reconstructed images are kept in the memory 19 of the server 1. At the following step (S611), the cost in memory is estimated of the decoding of step S610 and the estimated cost is stored in the field "cost in memory" of the TSS associated with the transcoding method t (in this embodiment, this cost essentially depends on the spatial resolution of the images to decode).

The following step, S612, consists of estimating in terms of algorithmic complexity the computational capacity necessary to perform the decompression and the display of the segment transcoded by the method t. In relation to this, it may be recalled that a "block" is composed of 8×8 pixels and that a "macroblock" (MB) is composed of 16×16 pixels, i.e. 4 so-called "luminance blocs", plus a certain number (between 2 and 8) of so-called "chrominance blocs"; for ease of understanding, it will be considered below that one MB is worth: 4+2=6 "blocks". It is also recalled that an image is said to be "Intra" if it can be decoded without having to refer to another image; the macroblocks composing such an image will be said to be "Intra" macroblocks. Finally, an image is said to be "predicted" when its decoding relies on a previous image, and an image is said to be "bidirectional" when its decoding must rely on two images, one of them before and one of them after; the "predicted" images that the "bidirectional" images together form the so-called "Inter" images, which are composed of both "Inter" macroblocks (requiring a reference for them to be decoded) and "Intra" macroblocks (requiring no reference). For further details on these different types of image encoding, as well as for the definition of a group of images, reference may be made to the standard ISO/IEC JTC1/SC 29/WG11 N3056 mentioned above.

For the estimation of complexity, for each decoded image, the number of Intra macroblocks will be retrieved denoted here by $NMB_{orig}^{Intra}$, and the number of Inter macroblocks, denoted here by $NMB_{orig}^{Inter}$, making it up. This information, which was stored beforehand in unit 19 of the server 1 at the decoding step S610, enable the complexity to be found for each image by means of the algorithm described in French patent application No. 0115092 in the name of Canon. The complexity of an image is given by the following formula:

$$O_{Image} = NMB_{orig}^{Intra} \times O_{Intra} + NMB_{orig}^{Inter} \times O_{Inter},$$

where $O_{Intra}$ is the decoding complexity for a macroblock of Intra type, and $O_{Inter}$ is the decoding complexity for a macroblock of Inter type. The most complex image will be searched for by going through all the images of the current segment.

An upper bound for the number of elementary operations per second necessary for the decoding of the sequence will be derived from the highest image complexity, which we will denote $O_{max}$. This upper bound will be termed O. In this embodiment, O will be calculated in the following manner:

$$O = O_{max} \times F_t \times NMB_{trans} / NMB_{orig},$$

where $F_t$ is the frame rate produced by the transcoding method t (for example from 30 Im/s to 1 Im/s in this embodiment), $NMB_{trans}$ is the number of macroblocks per image in the transcoded sequence (396 in CIF format, 99 for a sequence in QCIF format), and $NMB_{orig}$ is the number of macroblocks per image in the original sequence (396 in this embodiment).

The estimation of the decoding complexity of a macroblock varies according to whether the macroblock is encoded in Intra or Inter mode. In this embodiment, an estimation will be made of both these values according to the following procedures.

Firstly an estimation will be calculated of the decoding complexity $O_{Intra}$ for a macroblock of Intra type.

The decoding will be made block by block. Thus, the decoding complexity of a macroblock of Intra type will be equal to the complexity linked to the decoding of the six blocs which compose it. The estimation of the decoding complexity of a block is made by accounting for the number of elementary operations of the different algorithms which are involved in that decoding method. The values of the complexity related to the DCT decoding are supplied by the article by E. Feig et al. Entitled "*Fast Algorithms for the Discrete Cosine Transform*" (IEEE Trans. On Signal Processing, vol. 40, No. 9, September 1992).

Table 1 details the estimation of the decoding complexity of a block encoded in Intra mode.

The first column represents the different steps of the reconstruction. In particular, "Inverse Q" (for "Inverse Quantization") designates the step of Inverse Quantization, and "VLD" (for "Variable-Length codes Decoding") designates the step of entropy decoding involved between the reading of the digital data and the inverse quantization.

The first line lists the different types of operation involved in each step.

Each case indicates the number of operations of a certain type for a given step. All these operations are here considered to be elementary, except multiplication, which is considered to be equivalent to two elementary operations.

The last line shows the number of elementary operations associated with each type of operation. By summing the values of the last line, the total number of elementary operations is obtained, i.e. 1989, necessary for the reconstruction of an Intra block.

With these suppositions, the total decoding complexity of a macroblock encoded in Intra mode is 6×1989=11934 elementary operations.

An estimation of the decoding complexity $O_{Intra}$ will now be calculated for a macroblock of Inter type.

In this case, to the complexity of a macroblock encoded in Intra mode must be added the complexity related to the reconstruction of the movement vector on the basis of the differential movement vector transmitted, necessary for the reconstruction of the macroblock (reconstruction of the difference macroblock by addition of that macroblock and the predicted macroblock).

Table 2 details the estimation of this additional complexity required for the decoding of a macroblock encoded in Inter mode. By making the same assumptions as those described above for the Intra mode, it is found that the total decoding complexity of a macroblock encoded in Inter mode is: 9279+11934=21213 elementary operations.

Returning to FIG. 6, step S612 will also update the field "decoding complexity" of the TSS associated with the transcoding method t with the estimated value "O". Step S613 comes next, during which the deterioration generated by the transcoding of the current segment is calculated. This deterioration is utilized as a measure of the quality of the transcoded segment: the lower the deterioration, the higher the quality is judged. The calculation of this deterioration consists of calculating the PSNR, for each image of the transcoded segment, with the images decoded at step S602 as reference, retrieved from unit 19 of server 1. The mean of the PSNRs over the segment is next kept and stored in the field "PSNR" of the TSS associated with the transcoding method t. To be able to calculate the representative PSNR, it is necessary to compare sequences having the same format and the same frame rate. For this, in this embodiment, is thus proposed to convert the images of the segment transcoded at step S605 to the frame rate and spatial resolution of the images of the original segment obtained at step S602. On reducing the format in this embodiment, each pixel at the spatial position (x, y) of the encoded sequence will be repeated 4 times in the re-dimensioned sequence at the positions (2x, 2y), (2x+1, 2y), (2x, 2y+1) and (2x+1, 2y+1). On reduction of the frame rate, the missing images will be replaced by repeating the last image received. Note that this procedure makes it possible to simulate the loss of quality due to the change in resolution whether temporal or spatial.

Further to the step S613, the test of the transcoding method (t+1) is proceeded to, at the following step S608, if there is one (test of step S609).

The process terminates for a segment when the response to the test of step S609 is "false". The images decoded further to steps S602 and S610 are then deleted from unit 19 of server 1 as well as the segment re-encoded at step S605.

If segments remain to be processed (response "no" to the test of step S614), that algorithm is reiterated from step S602. The process terminates for the sequence S when the last segment has just been processed (response "true" to the test of step S614).

The "online" part of the method will now be described. This occurs:
  either on connection of a client,
  or on disconnection of a client,
  or cyclically if no client connects or disconnects.

The object of this "online" part is first of all to take advantage of all the information obtained in the "offline" phase of the algorithm in order to optimize the group of connections to provide optimum satisfaction to the group of users connected at a given moment. The task of the decision engine 12 of the server 1 is, on the basis of the status of the network and of the requested contents, to find the encoding parameters corresponding optimally to the preferences of a given user and to the capabilities of its receiver. In the context of the present invention, the designation "elementary transcoding instruction" (ETI) will be used for the parameters determined by the decision engine 12 to transcode a group of digital data associated with contents requested by a client. In the present embodiment, for each ETI the following information is chosen as parameters:
  the spatial resolution of the images.
  the display frequency of the images,
  the rate allocated, in kbit/s, for the representation of the compressed contents, and
  the structure of the groups of images: distance between two Intra images, and number of consecutive bidirectional images.

The decision engine 12 has memory space enabling it to store those elementary transcoding instructions, further to a decision process such as the one described below. This decision engine 12 drives the transcoding unit 17 which, on the basis of the parameters contained in the ETI, performs the adaptation of a group of digital data associated with the contents requested by the client. In the present embodiment, this adaptation is performed by an MPEG-4 type re-encoding.

Moreover, the decision engine 12 maintains, in an internal memory, a table of the connections described below with reference to FIG. 8.

Figure 2:
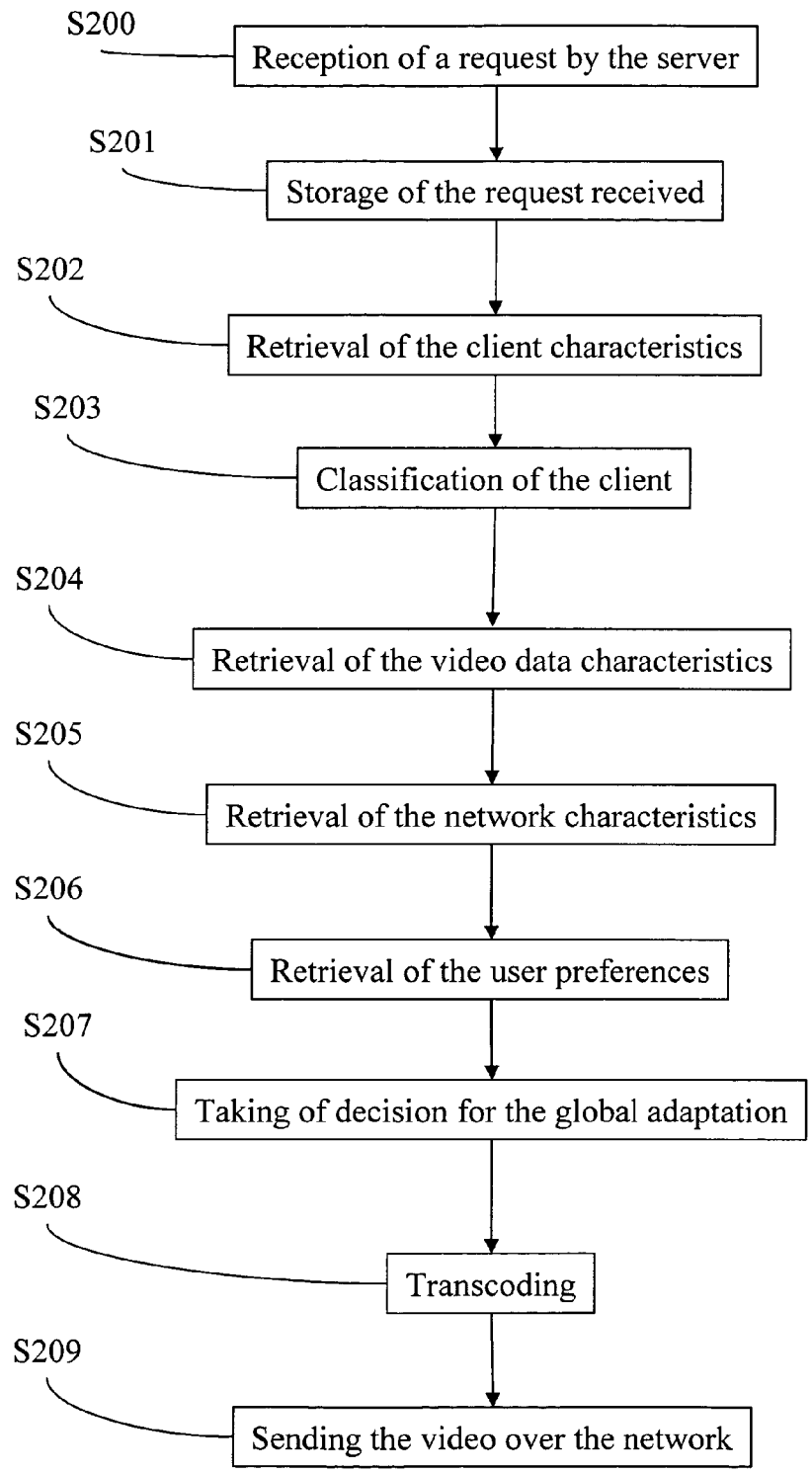
FIG. 2 represents an algorithm implemented further to the connection of a client.

FIG. 2 represents an "online" algorithm which is implemented further to the connection of a client, The first step, S200, of FIG. 2, corresponds to the arrival of the request from the client machine 3 to the server 1. This request is stored in the temporary storage unit 19 of server 1 at step S201 in order to be processed. The table of the connections in memory of the decision engine 12 of the server 1 is also updated by the insertion of an identifier for the new client. The cyclical alarm 20 of the server 1 is also re-started. The processing commences with the extraction of the parameters relating to the client machine 3 by unit 15 of the server at step S202.

This step is followed by step S203 of classifying the client depending on its capabilities. This step S203 is detailed in sub-steps in FIG. 3.

Figure 3:
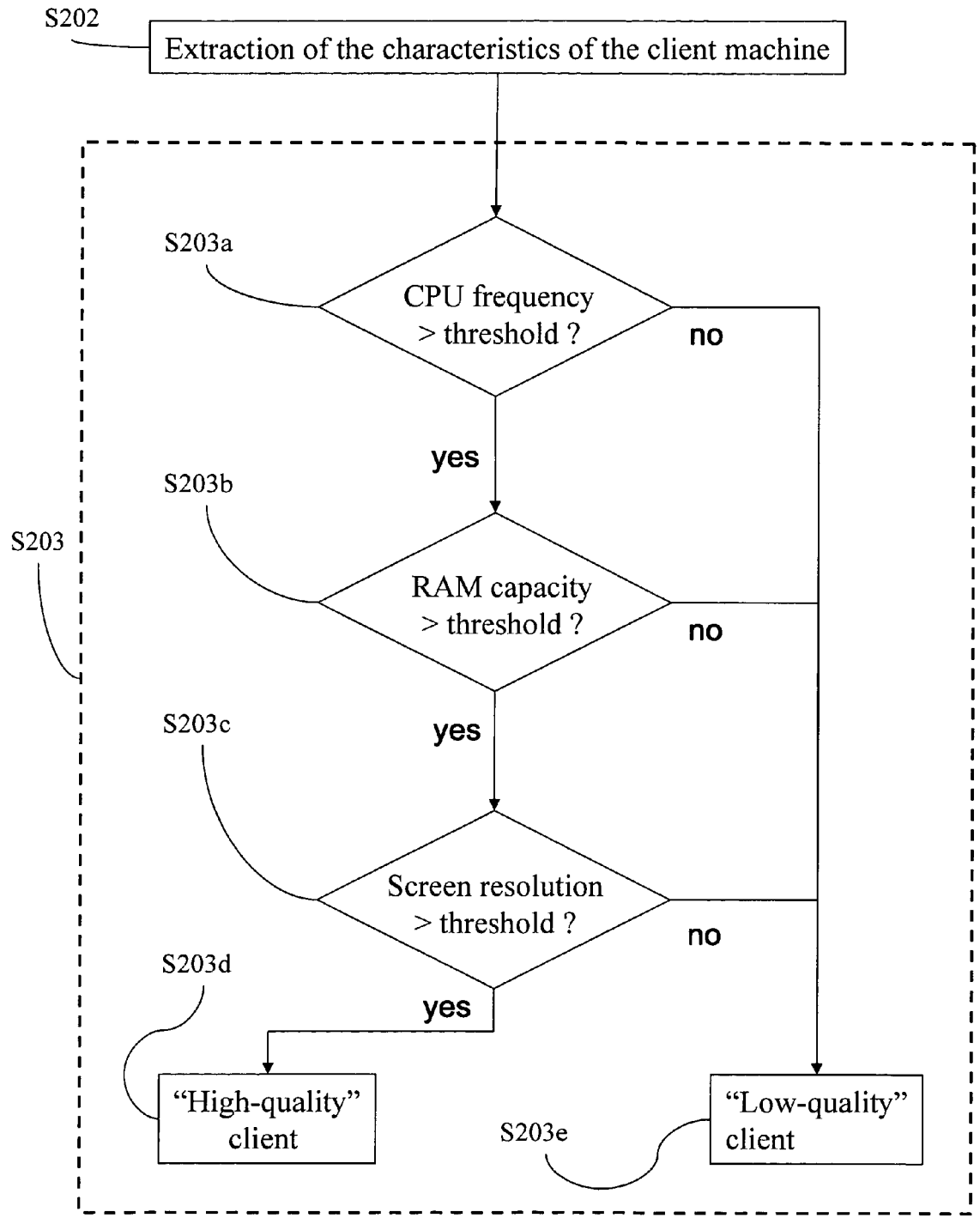
FIG. 3 represents an algorithm for classifying a new connected client according to its capabilities.

In FIG. 3, step S202 of extracting the parameters relating to the client 3 is again mentioned as initialization of the classification process. It may be recalled that in the present embodiment, these parameters relating to the client concern the frequency of the central processor, the size of the screen, and the random-access memory available to the client machine 3. At step S203a, the frequency of the central processor of the client is compared to a threshold, for example 500 MHz in this embodiment. If this frequency is less than the threshold, then (step S203e) the client machine is immediately classified as a "low-quality" machine. Otherwise, at step S203b, the size of the random-access memory (RAM) is also compared to a threshold, equal to 128 Mb in this embodiment. If the client machine's RAM is below the threshold, that machine is then classified as "low-quality" at step S203e. In the opposite case, at step S203c, the size of the screen is compared to a predefined size (352×288 in this embodiment). Once again, if the client machine has a screen resolution below that threshold, it is then classified in the "low-quality" category at step S203e. In the opposite case, at step S203d, the client machine is classified as a "high-quality" machine.

Steps S203d and S203e correspond to the insertion of an identifier of the class found for the client, into the table of the connections of the decision engine 12 of server 1, represented in FIG. 8: in that Figure, the "low-quality" class is denoted LQ and the "high-quality" class is denoted HQ. This identifier will be used later at step S207 corresponding to the calculation of the new adaptation parameters of the videos requested. The value of this classification of the clients is to limit the search space for the global solution which maximizes the quality of service of the clients at a given moment, and reduces the adaptation of the contents to the client to a limited number of tests.

Further to classification step S203, again with reference to FIG. 2, step S204 takes place in which unit 15 of server 1 dedicated to the retrieval of information on the contents returns the name of the video requested as well as the identifier of the class of the first image (see above the description of FIG. 4). These two items of information are introduced into the table of connections of the decision engine 12 of server 1 represented in FIG. 8.

At step S205, the characteristics of the network are retrieved by means of unit 14 of server 1: these are in particular its bandwidth (or maximum rate $R_{max}$).

At step S206, the preferences of the user are retrieved by means of unit 16 of server 1; the corresponding information will be taken into account at step S509 described below with reference to FIG. 5.

Step S207 then takes place of decision taking as to the new encoding parameters of the contents requested as well as of all the contents in course of transmission. This step S207 is described later on with reference to FIG. 7. Further to that step, the new transcoding instructions are applied by unit 17 of server 1 to the different bitstreams in course of distribution at step S208, and the new video data thus constructed are sent to the client 3 by unit 18 of the server 1 during step S209.

Figure 5:
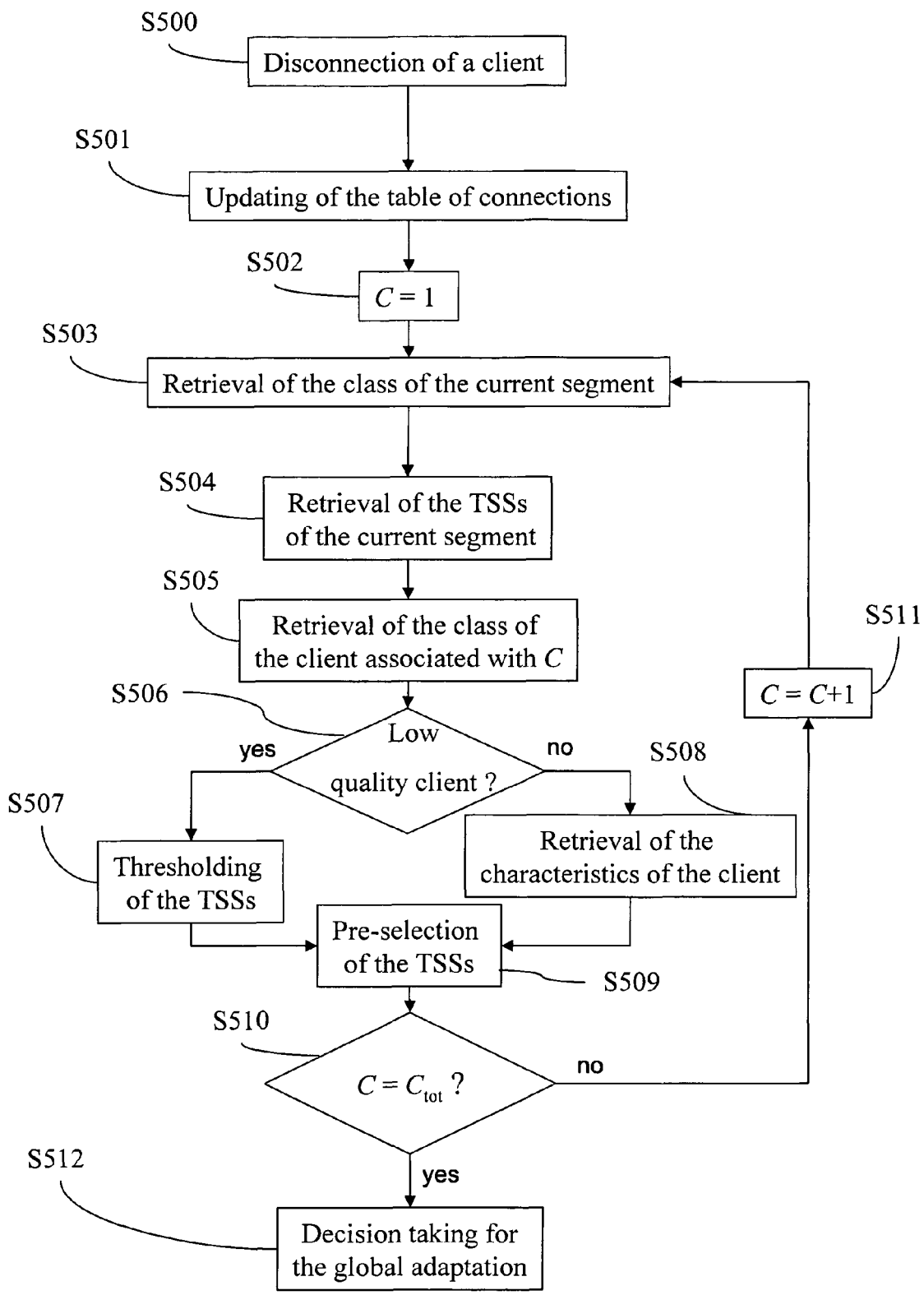
FIG. 5 represents an algorithm implemented further to the disconnection of a client.

FIG. 5 represents an "online" algorithm which is implemented further to the disconnection of a client, Firstly, when a client disconnects, server 1 is informed at a step S500. It terminates the connection with the client concerned then updates the table of connections (see FIG. 8). This is performed at step S501 in which the information relating to the connection which has just been closed is removed from the table of connections. The server 1 in particular updates the value of $C_{tot}$, which represents the total number of clients connected. The cyclical alarm 20 of the server 1 is also re-set.

Then at step S502, the variable C is defined, designating the entry index in the table of connections, which is initialized to 1 so as to point to the first connection. The following step S503 consists of retrieving the index of the sequence as well as the number of the last image sent by unit 18 of server 1. This image number makes it possible to access the table associated with the sequence, in memory 4 of the server 1, where the class indicators are stored of the different temporal segments as well as the associated TSSs. Thus the class (HM/HS, HM/LS, LM/LS or LM/HS in this embodiment) of the next segment is identified during this step S503. Next, via the same table of unit 4, at step S504 the TSSs associated with the future segment (48 in this embodiment) are retrieved. Step S505 consists in retrieving from the connection table of the decision engine the class of the client associated with connection number C. At step S506 it is then tested whether that client is of "low-quality" type or not.

If it is of "low-quality", step S507 is passed on to which consists in pre-sorting the TSSs by a simple thresholding operation on their fields:

"required computational capacity" with the threshold utilized at step S203a of FIG. 3, "cost in memory" with the threshold utilized at step S203b of FIG. 3, "spatial resolution" with the minimum between the threshold utilized at step S203c of FIG. 3 and the display preferences of the user retrieved by the unit 16 of the server 1 at step S206 of FIG. 2, and "frame rate" with the display frequency desired by the user, also retrieved by unit 16 of server 1 at step S206 of FIG. 2.

If at least one of these quantities exceeds one of the thresholds, the associated transcoding method is considered as not pertinent for the future adaptation of the contents. At step S509 this information is transferred to the connection cable of the decision engine 12 (see the "x"s of FIG. 8). The effect of this is to rapidly eliminate TSSs of the process of selection of the set of the TSSs which makes it possible to maximize the quality for all the users connected.

If it is a so-called "high-quality" client, the pre-selection process of the TSSs of step S509 is less immediate: one needs first, at step S508, to retrieve the frequency of the central processor of the client, the size of its memory and the dimensions of its screen. Next, for each TSS, a comparison of the CPU frequency of the client with the field "necessary computational capability" is performed. If the client has the available capability, it is then verified if the same applies for the size of its memory then for the dimensions of its screen. Each TSS which, on the one hand, necessitates resources that are less than or equal to the capabilities of the client, and on the other hand, produces a transcoded sequence of which the spatial resolution and frame rate remain compatible with the preferences of the user, is inserted in the table of connections of the decision engine 12. All the others, marked "x" in the table of connections, are excluded from the decision process for the global adaptation.

Next at step S510 it is tested whether that was the last connection. If yes, the decision process for the global adaptation process described further on is proceeded to, at step S512. Otherwise, step S511 makes it possible to point to the following connection for which the steps S503 to S510 are reiterated, until the last connection.

The third and last case triggering the "on-line" part of the invention is the periodical renegotiation which will now be detailed. This renegotiation is triggered by the cyclical alarm 20 of server 1 of FIG. 1 every 15 seconds in this embodiment. As soon as a connection or a disconnection occurs, the alarm is reset to it starting value (15 seconds) and the countdown is triggered. If after 15 seconds, no connection or disconnection has occurred, then the decision engine 12 of server 1 is informed of the expiry of the alarm and proceeds with a renegotiation of the connections. This renegotiation is performed in the same manner as for the disconnection of a client, i.e. using steps S502 to S512 of FIG. 5. The alarm is next reset to its starting value then a new countdown is set off.

Next, the last step of the "on-line" part of the invention which remains to be described is a key step of the invention: the taking of the decision for the global adaptation (steps S207 of FIG. 2 and S512 of FIG. 5). This step relies on the table of connections of the decision engine 12 and in particular on the TSSs associated with each connection. As indicated above, the adaptation of the contents must take into account:

the characteristics of the contents,
the characteristics of the client machine,
the preferences of the users, and
the constraints of the network.

The first point is achieved by the classification of the contents into temporal segments of the same properties, described in the "offline" part of the invention with reference to FIG. 4. The second and third points are taken into account by step S509 of FIG. 5 of pre-selecting the TSSs associated with the segments of each sequence in course of adaptation.

It thus remains to consider the last point relative to the network constraints, i.e. the bandwidth available at the moment of taking the decision. The object of this step is thus to find the TSS combination (one per connection, of course) which maximizes the global quality of the transmission and which respects the following constraint: the sum of the rates of each connection must remain less than or equal to the available bandwidth.

Figure 7:
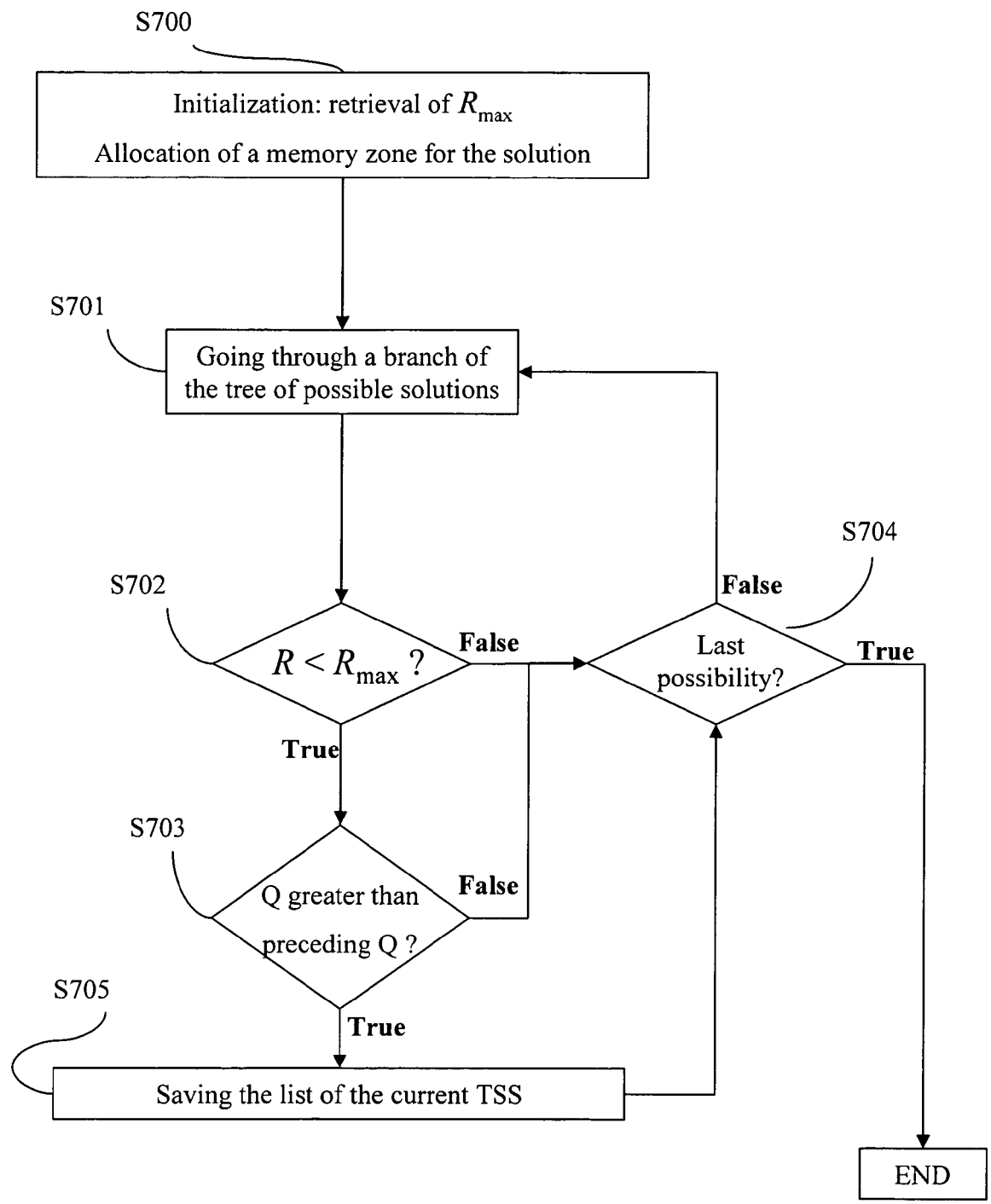
FIG. 7 represents an algorithm for selecting the global distribution solution.

The rate and quality information relating to a connection are fields directly available in the TSSs associated with the connection considered. The search for the global solution is thus reduced to the conventional rate/distortion compromise: minimize the distortion under a constraint of maximum rate. To find this solution, the simplest method consists of performing an exhaustive search among the set of the TSSs present in the table of connections of the decision engine 12. This method is illustrated in FIG. 7.

In this Figure the main steps of the search appear. Firstly at step S700, an initialization of the search is performed (it should be recalled that $R_{max}$ represents the maximum rate available for the network, and that it was obtained at step S205 by unit 14 of server 1). The annotation $$R \equiv \sum_{C=1}^{C_{tot}} r(C)$$

is used for the cumulative rate, where r(C) designates the rate associated with a TSS envisaged for client number C. Finally, the global quality of all the connections is represented by a factor Q; this global quality factor Q may, for example, be simply calculated according to the expression $$Q = \sum_{C=1}^{C_{tot}} q(C),$$

where q(C) is the individual quality factor associated with a TSS envisaged for client number C; for example, the individual quality factor can be taken equal to the PSNR defined above. In a variant, use may conveniently be made of a weighted sum of individual quality factors depending on certain predetermined criteria, for example, the fact that certain clients are "privileged" with respect to the others. The values of R and of Q are initialized to zero at step S700.

If the number T of possible transcoding methods is considered, 48 in this embodiment, an exhaustive search would give $T^{C}_{tot}$ possibilities. Advantageously, the pre-selection at step S509 (see FIG. 5) makes it possible to reduce the search to $$\prod_{C=1}^{C_{tot}} card_{SST}(C),$$

where $card_{SST}(C)$ represents the number of pertinent TSSs associated with a given connection C, present in the connections table (in practice, the various thresholds and parameters will naturally be set such that there exists at least one of pertinent TSS whatever the connection, in other words $card_{SST}(C)$ is always at least equal to 1). Each global solution is represented by:

the list of the $C_{tot}$ TSSs,
the rate R generated, and
the resulting quality factor Q, and, to be acceptable, it must satisfy: $R \leq R_{max}$.

The initialization step S700 terminates by the allocation in memory of the decision engine 12 of a zone reserved for the storage of such a global decision.

The following step S701 is a step of going through, from the first to the last connection, of a branch of the tree formed by the set of the TSSs present in the table of connections of the decision engine 12 (see FIG. 8). On going through a branch, the cumulative rate R and the global quality factor Q are updated. Next, at the end of going through the branch, R is compared to $R_{max}$ at step S702. If R remains less than or equal to $R_{max}$, then the global quality factor Q is compared to the quality of the last branch stored as a possible solution (comparison to zero on going through the first branch). This is performed at step S703. If the quality is less than the quality of the previous solution, then exploration of the following branch is proceeded with, if there is one (test of step S704). On the contrary, if the result of step S703 is "true", then the list of TSSs corresponding to the branch explored is recorded (step S705) in the zone allocated in memory of the decision engine 12 at step S700. The associated quality factor Q is also saved at step S705. Steps S701 to S705 are reiterated until the entire tree has been gone through.

The transcoding methods to apply at each connection are then copied to the memory zone of the decision engine reserved for the elementary transcoding instructions, for application at step S208 described above. If, however, at the time of the search procedure and specifically in case of connection of a new client, no branch of the tree gives an acceptable solution (for which $R \leq R_{max}$), then that new client is informed that the service is not immediately available, such that the new client is free to wait or to disconnect.

Figure 9:
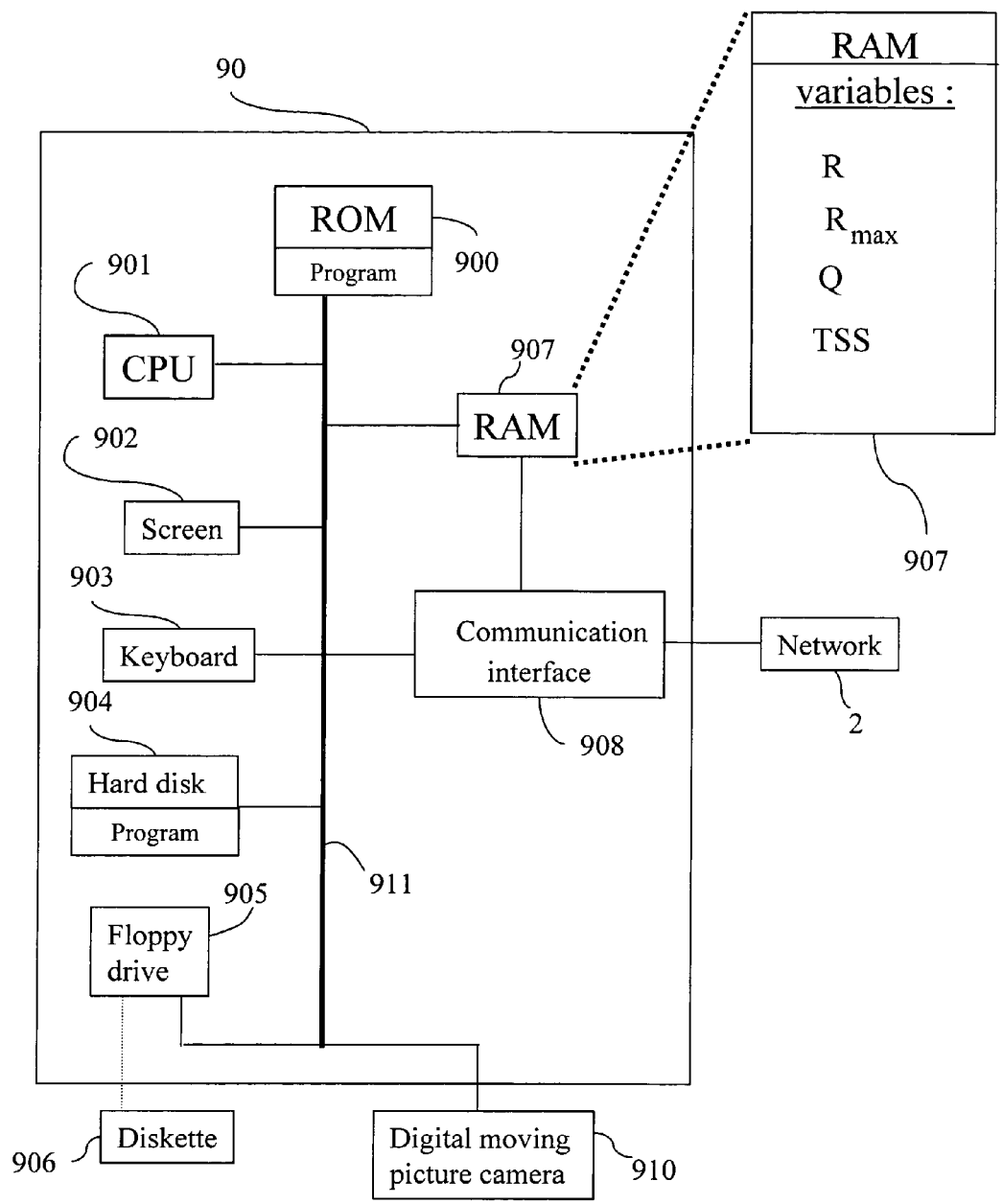
FIG. 9 represents a computer device adapted to implement the method according to the invention.

The block diagram of FIG. 9 represents, in a very simplified manner, a computer 90 incorporating server 1, which here is in the form of a logic unit.

This computer 90 is adapted to process multimedia digital data with a view to transmitting them. In this embodiment, the methods of context retrieval, encoding and decoding, and of the adaptation of the encoding parameters are implemented in the form of computer programs. A means of information storage, readable by a computer or by a microprocessor, integrated or not in that computer, and possibly removable, is adapted to store a program implementing the methods of adaptation in accordance with the invention; as a variant, said programs may be set in application-specific integrated circuits (ASICs).

In FIG. 9, the computer 90, which may be a microcomputer or a workstation, is connected to different peripherals, for example a digital moving picture camera 910 or any other device for acquiring or storing images, such as a scanner, providing the computer with videos to adapt and to transmit. These videos may be stored in the means of storage available to the computer such as a hard disk 904.

The computer 90 also comprises a communication interface 908, associated with the sending and receiving device 18 of server 1, connected to the communication network 2.

Computer 90 also comprises means for storing data such as the hard disk 904, a floppy drive 905 enabling data to be written onto a diskette 906 and that data to be read. The computer 90 may also comprise a compact disc reader (CDROM) (not shown), as well as a computer card (PC- CARD) reader (not shown). The digital data of the database 4 may be stored on one of these storage means, or on an additional unit external to the computer 90.

In this embodiment, the executable code of the programs enabling implementation of the methods of adaptation of videos according to the invention, is stored on a computer-readable storage means, such as the hard disk 904. According to a variant form, the executable code of these programs is stored in a read-only memory (ROM) 900 of the computer. According to second variant form, the executable code of the program or programs may be downloaded from the communication network 2 via the communication interface 908, in order to be stored on the hard disk 904. The computer 90 further comprises a screen 902 making it possible to view the videos to be processed and serving as a graphical interface with the user, and a pointing device (not shown), such as a mouse or optical stylus or a keyboard 903 so as to be able to interact with the program. The computer comprises a central processing unit (CPU) 901, for example a microprocessor, which controls and directs the execution of the instructions of the program or programs of the invention stored on the ROM 900 or on the hard disk 904. The central processing unit 901 has the role of the control unit 11 described above with reference to FIG. 1.

The computer 90 also comprises a RAM memory 907. As can be seen in the enlarged representation of the RAM 907 of FIG. 9, the latter comprises registers adapted to store the variables created and modified during the execution of the program or programs according to the invention, in particular the variables mentioned above in the description, with reference to FIGS. 6 and 7.

Finally, computer 90 comprises a communication bus 911 to enable communication and interoperability between the different aforementioned components making up the computer.

TABLE 1

| Processing | test | Multiplication | Addition | cation |
|---|---|---|---|---|
| VLD for DCT | | | | 64 |
| Inverse Q | 192 | 256 | | 192 |
| Saturation | 128 | | 64 | |
| Control | 2 | | 64 | 65 |
| Inverse DCT | | 94 | 454 | 64 |
| Total (of elementary operations) | 322 | 2 × 350 | 582 | 385 |

TABLE 2

| Processing | test | Multi-plication | Addition | Allocation |
|---|---|---|---|---|
| VLD for movement vector | | | | 2 |
| Reconstruction of movement vector | 7 | 5 | 13 | 11 |
| Reconstruction of difference MB | 1288 | 1400 | 2328 | 1540 |
| Construction of predicted MB | | | 512 | 256 |
| Reconstruction of the MB | | | 256 | 256 |
| Total (of elementary operations) | 1295 | 2 × 1405 | 3109 | 2065 |

The invention claimed is:

1. A method of distributing bitstreams by a server device to a plurality of client devices connected to said server device via a network, in which said server device transfers a bitstream via said network to a client device belonging to said plurality of client devices, and in which said bitstream is to be transcoded according to a plurality of predetermined transcoding methods, said method comprising the following steps:

a) calculating a rate associated with each of said bitstreams resulting from application of at least one of said plurality of transcoding methods;

b) classifying a quality of each client device of said plurality of client devices;

c) for each client device of said plurality of client devices, determining, among said plurality of predetermined transcoding methods, those which are acceptable for said client device, depending on said calculated rates of the bitstreams and said classification of the quality of the clients; and d) performing a global selection to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network, wherein said global selection is performed each time a client device connects to the network so as to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network, and wherein said global selection is performed each time a client device previously connected to the network disconnects so as to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network.

2. A method according to claim 1, wherein the quality of the client devices are classified according to a frequency of a central processor for each client device, and/or a size of random-access memory for each client device, and/or a dimension of a monitor for each client device.

3. A method according to claim 1, wherein said bitstream is associated with a video, and wherein the global selection is made based on predetermined criteria including temporal and/or spatial characteristics of the contents of each said bitstream, and wherein the temporal and/or spatial characteristics of the video comprise a spatial resolution, and/or a frame rate, and/or a spatio-temporal activity of temporal segments of the video in which the characteristics taken into account have a relatively uniform value.

4. A method according to claim 1, further comprising a step of retrieving preferences of users of the client devices, and wherein said determination, at step c), of the acceptable transcoding methods for each client connected to the network also takes into account the user preferences.

5. A method according to claim 1, wherein said step of performing a global selection further comprises taking into account, in addition to the bandwidth, other characteristics of the network.

6. A method according to claim 1, wherein said step of performing the global selection comprises a maximization of a global quality factor calculated, for any given set of pairs consisting of a bitstream requested by a client device and transcoding method acceptable for said client device, as a function of individual quality factors respectively attached to at least some of the pairs.

7. A method according to claim 6, wherein the global quality factor is equal to the sum of the individual quality factors each respectively attached to the bitstream requested by a client device connected to the network.

8. A method according to claim 6, wherein the global quality factor is equal to a weighted sum of the individual quality factors each respectively attached to the bitstream requested by a client device connected to the network.

9. A method according to claim 6, wherein said individual quality factor is obtained by encoding the bitstream considered with the transcoding method considered, and in accordance with a deviation between the bitstreams considered before and after transcoding, and with a dynamic range of an original signal.

10. A method according to claim 1, wherein said global selection is made each time a programmable cyclical alarm reaches its term.

11. A method according to claim 1, wherein said step of calculating a rate is performed prior to client device connection.

12. A method according to claim 1, wherein, upon connection of a client device, the steps of determining a quality and of determining acceptable methods are performed for said client device.

13. A method according to claim 1, wherein the step of calculating a rate associated with a transcoded bitstream further comprises determining information representative of a frame rate of the transcoded bitstream, a spatial resolution of the transcoded bitstream and a computation power necessary for decoding the transcoded bitstream.

14. A method according to claim 1, wherein said global selection comprises taking into account, in addition to the rate, other characteristics of the contents of the bitstream requested by each client connected to the network.

15. A server apparatus for the distribution of bitstreams to a plurality of client devices connected to said server apparatus via a network, wherein said server apparatus transfers a bitstream via said network to a client device belonging to said plurality of client devices, said bitstream to be transcoded by a plurality of predetermined transcoding methods, said server apparatus comprising:
a processor and a memory;
a transcoding unit for calculating a rate associated with each of said bitstreams resulting from having applied at least one among said plurality of transcoding methods;
a classifying unit for classifying a quality of each client device of said plurality of client devices; and
a decision engine for, for each client device of said plurality of client devices, determining, among said plurality of predetermined transcoding methods, those which are acceptable for said client device, depending on said calculated rates and said classification of the quality of the client devices, and for performing a global selection to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network,
wherein said global selection is performed each time a client device connects to the network so as to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network, and
wherein said global selection is performed each time a client device previously connected to the network disconnects so as to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network.

16. A server apparatus according to claim 15, wherein said classifying unit retrieves temporal and/or spatial characteristics for each client device connected to the network, where the temporal and/or spatial characteristics comprise a frequency of a central processor for the client device, and/or a size of random-access memory for the client device, and/or a dimension of a monitor for the client device, and classifies the quality of the devices accordingly.

17. A server apparatus according to claim 15, wherein the bitstream transferred to a client device is associated with a video, and wherein the global selection is made based on predetermined criteria including temporal and/or spatial characteristics of the contents of each said bitstream, and wherein the temporal and/or spatial characteristics of the video comprise a spatial resolution, and/or a frame rate, and/or a spatio-temporal activity of temporal segments of the video in which the characteristics taken into account have a relatively uniform value.

18. A server apparatus according to claim 15, further comprising a unit adapted to retrieve preferences of users of the client devices, and wherein said decision engine is adapted to take into account the user preferences.

19. A server apparatus according to claim 15, wherein said global selection made by the decision engine comprises maximizing a global quality factor calculated, for any given set of pairs consisting of a bitstream requested by a client device and transcoding method acceptable for said client device, as a function of individual quality factors respectively attached to at least some of said pairs.

20. A server apparatus according to claim 19, wherein said global quality factor is equal to the sum of the individual quality factors each respectively attached to the bitstream requested by a client device connected to the network.

21. A server apparatus according to claim 19, wherein said global quality factor is equal to a weighted sum of the individual quality factors each respectively attached to the bitstream requested by a client device connected to the network.

22. A server apparatus according to claim 19, wherein said individual quality factor is obtained by encoding the bitstream considered with the transcoding method considered, and in accordance with a deviation between the bitstreams considered before and after transcoding, and with a dynamic range of an original signal.

23. A server apparatus according to claim 15, further comprising a programmable cyclical alarm, and wherein said decision engine implements said global selection each time said cyclical alarm reaches its term.

24. A non-transitory computer readable storage medium on which is stored a computer executable program that, when executed by a computer, implements a method of distributing bitstreams by a server device to a plurality of client devices connected to said server device via a network, in which said server device transfers a bitstream via said network to a client device belonging to said plurality of client devices, and in which said bitstream is to be transcoded according to a plurality of predetermined transcoding methods, said method comprising the following steps:

a) calculating a rate associated with each of said bitstreams resulting from application of at least one of said plurality of transcoding methods;

b) classifying a quality of each client device of said plurality of client devices;

c) for each client device of said plurality of client devices, determining, among said plurality of predetermined transcoding methods, those which are acceptable for said client device, depending on said calculated rates of the bitstreams and said classification of the quality of the clients; and d) performing a global selection to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network, wherein said global selection is performed each time a client device connects to the network so as to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network, and wherein said global selection is performed each time a client device previously connected to the network disconnects so as to select a transcoding distribution solution in which an acceptable transcoding method is associated with each client device of said plurality of client devices, and in which the sum of calculated rates of bitstreams resulting from the transcoding methods in the transcoding distribution solution is less than or equal to a bandwidth of the network.

25. A non-transitory computer readable storage medium according to claim 24, wherein the quality of the client devices are classified according to a frequency of a central processor for each client device, and/or a size of random-access memory for each client device, and/or a dimension of a monitor for each client device.

26. A non-transitory computer readable storage medium according to claim 24, wherein said bitstream is associated with a video, and wherein the global selection is made based on predetermined criteria including temporal and/or spatial characteristics of the contents of each said bitstream, and wherein the temporal and/or spatial characteristics of the video comprise a spatial resolution, and/or a frame rate, and/or a spatio-temporal activity of temporal segments of the video in which the characteristics taken into account have a relatively uniform value.

27. A non-transitory computer readable storage medium according to claim 24, further comprising a step of retrieving preferences of users of the client devices, and wherein said determination, at step c), of the acceptable transcoding methods for each client connected to the network also takes into account the user preferences.

28. A non-transitory computer readable storage medium according to claim 24, wherein said step of performing a global selection further comprises taking into account, in addition to the bandwidth, other characteristics of the network.

29. A non-transitory computer readable storage medium according to claim 24, wherein said step of performing a global selection comprises a maximization of a global quality factor calculated, for any given set of pairs consisting of a bitstream requested by a client device and transcoding method acceptable for said client device, as a function of individual quality factors respectively attached to at least some of said pairs.

30. A non-transitory computer readable storage medium according to claim 29, wherein the global quality factor is equal to the sum of the individual quality factors each respectively attached to the bitstream requested by a client device connected to the network.

31. A non-transitory computer readable storage medium according to claim 29, wherein the global quality factor is equal to a weighted sum of the individual quality factors each respectively attached to the bitstream requested by a client device connected to the network.

32. A non-transitory computer readable storage medium according to claim 29, wherein said individual quality factor is obtained by encoding the bitstream considered with the transcoding method considered, and in accordance with a deviation between the bitstreams considered before and after transcoding, and with a dynamic range of an original signal.

33. A non-transitory computer readable storage medium according to claim 24, wherein said global selection is made each time a programmable cyclical alarm reaches its term.

\* \* \* \* \*